(12) United States Patent
Partridge

(10) Patent No.: US 9,278,575 B2
(45) Date of Patent: Mar. 8, 2016

(54) COMPOSITE ORNAMENTAL OBJECT AND METHOD OF FABRICATION

(71) Applicant: Jennifer Rose Partridge, Raleigh, NC (US)

(72) Inventor: Jennifer Rose Partridge, Raleigh, NC (US)

(73) Assignee: Jennifer Partridge, Raleigh, NC (US)

( * ) Notice: Subject to any disclaimer, the term of this patent is extended or adjusted under 35 U.S.C. 154(b) by 207 days.

(21) Appl. No.: 13/932,079

(22) Filed: Jul. 1, 2013

(65) Prior Publication Data

US 2015/0004380 A1 Jan. 1, 2015

(51) Int. Cl.
| | |
|---|---|
| *B32B 3/00* | (2006.01) |
| *B44F 1/04* | (2006.01) |
| *B32B 37/16* | (2006.01) |
| *B44C 5/02* | (2006.01) |
| B32B 37/12 | (2006.01) |
| A41D 27/08 | (2006.01) |
| A41D 31/00 | (2006.01) |
| A44C 27/00 | (2006.01) |

(52) U.S. Cl.
CPC .................. *B44F 1/045* (2013.01); *B32B 37/16* (2013.01); *B44C 5/02* (2013.01); *A41D 27/08* (2013.01); *A41D 31/0094* (2013.01); *A44C 27/001* (2013.01); *B32B 37/12* (2013.01); *B32B 2307/412* (2013.01); *B32B 2307/416* (2013.01); *B32B 2451/00* (2013.01); *Y10T 428/24851* (2015.01)

(58) Field of Classification Search
CPC ............... Y10T 428/24802; Y10T 428/24851; B32B 37/12; B32B 37/16; B32B 2307/412; B32B 2307/416; B32B 2451/00
See application file for complete search history.

(56) References Cited

U.S. PATENT DOCUMENTS

2008/0271354 A1* 11/2008 Bostrom .......................... 40/615

\* cited by examiner

*Primary Examiner* — Elizabeth Mulvaney

(57) ABSTRACT

This invention provides an ornamental object having therein, but not limited to, a reflective surface (1), a transparent substrate (2), an affixed image (3), and a synthetic resin (4). The process of manufacturing is also included. Specifically, as it relates to such methods used to create ornaments, jewelry, clothing adornment, fine art, home decorations, and imitation gemstones.

2 Claims, 3 Drawing Sheets

COMPOSITE ORNAMENTAL OBJECT AND METHOD OF FABRICATION

This application claims priority to U.S. Provisional Patent Application No. 61/667,647 filed Jul. 3, 2012, the disclosure of which are hereby incorporated by reference in their entireties.

FIELD OF INVENTION

This invention relates to composite ornamental objects. Specifically, it relates to such ornaments used for jewelry, clothing adornments, fine art, home accessories and imitation gemstones.

BACKGROUND OF THE INVENTION

Making jewelry from photographs has always seemed like a way to make jewelry more personal; however, a piece of glass tile placed over a photograph lacks creativity, depth, stereoscopy, dynamics, and vibrancy. Also the piece is usually comprised of a photograph of an individual which holds value to a very small amount of people making mass production not commercially viable. An improvement on the idea of including an image in a less personal but more engaging and 3-dimensional way is thru lenticular printing. Lenticular printing, U.S. Pat. No. 5,424,553, creates the illusion of motion in the images. However, the final product does not have a dynamic reaction to various light sources, the pictures range of reactivity is defined regardless of the environment.

A more light sensitive option is Dichroic glass, patented by Ravenscroft in 1674, has been around since the 4th century. The main appeal is that the glass transmits one color and reflects back several others producing a range of colors. The process of creating dichroic glass is not easy and few manufactures create the glass for use in jewelry. And artists who use dichroic glass require a number of specialty tools and proper ventilation. Also the images created are not photographic replicas even to attempt such precision with dichroic glass requires the use of a laser.

Painting with acrylic, oils, or a combination of both on a highly buffed metal surface is the latest in offering detailed images in a more texturally appealing and engaging way; however, the images lack stereoscopic dimensionality.

Capturing objects in resin has long been used to create jewelry. The resin increases dimensionality, as well as seals and protects the enclosed object. Lacking a mirrored component this type of jewelry is not responsive to environmental stimulus. When resin is used as a high gloss sealer it can enhance vibrant colors but again it lacks reactivity with ambient light. The same claims hold true for objects placed in plastic as well.

It will be immediately apparent that the present invention thus defined provides various distinct advantages over various prior art. Using the process of resin over a photographic image affixed to a transparent substrate adhered to a mirrored component offers high quality images that are durable and can be personal yet commercially viable. These composite ornamental objects are versatile, dynamic, stereoscopically dimensional, reflective and vibrant. A product superior to other alternatives available today. The process is easily replicable and does not require the use of highly toxic materials or specially modified tools.

The use of laser printing U.S. Pat. No. 6,795,105 on metal or mirrors is also an option; however, here again we run into practicality issues for the individual consumer. These printers are limited in their ability to print small, very large or irregular shaped objects. Also the laser printer cannot print multiple layers to create photographically realistic images. Printing portraits on a laser printer results in ghostly replications. As my process accounts for small or large sizes, irregular sizes, multiple layers, and even the addition of other mediums there is an obvious advantage over laser printing.

Imitation gems U.S. Pat. No. 5,273,795 made from acrylic glass (PMMA) so called plexiglass are used primarily in the clothing industry because of their low manufacturing cost and light weight. Although they have an aluminum component which is reflective these gems do not offer the photographic element that my product does. The advantages over acrylic gems that my product also offer are multiple colors, patterns, images, and customizable designs in each stone. Acrylic gems are fabricated using molds which limits their size and shape. Each of my ornamental objects can be created in many sizes and shapes. Another advantage over acrylic gems is that my process allows the inclusion of other objects and materials. Stones, gems, beads, etc., can be included creating textural and visual diversity.

SUMMARY OF THE INVENTION

A preferred embodiment of the composite ornamental object is illustrated in FIG. 1 (cross-section) and FIG. 2 (top view). In a preferred embodiment the composition has a depth variable base consisting of reflective component adhered to a suitable substrate. A layer of adhesive (FIG. 1) such as but not limited to, thermoplastic glue U.S. Pat. No. 4,384,083, or U.S. Pat. No. 3,616,005, or Judkins diamond glaze, which may or may not be present on top of the base. An image (FIG. 1) is printed and/or affixed to the transparent film U.S. Pat. No. 4,480,003 and/or substrate layer (FIG. 1), then adhered to the base via adhesive component. In the preferred embodiment a protective coating (FIG. 1) such as epoxy resin and polyamide hardner-available from Environmental Technology, Inc or New Parks:Zisser Co., Inc. maybe applied over the transparent film and/or substrate layer.

The base of the ornamental object has a variable thickness, and has overall variable dimensions. The outer corners (FIG. 1) are typically sanded, rounded or resin coated to avoid snagging and personal injury. The base can also consist of any other material that can be used as a mirrored component; buffed metal, glass with spray mirror finish, any transparent plastic substrate with spray mirror finish or metal backing, plexiglas with spray mirror finish, etc.

According to further embodiments of the invention, additional transparent substrate layers with affixed images may be included during fabrication. In conjunction with multiple transparent substrate layers with affixed images these layers may or may not include multiple layers of adhesives. In additional embodiments the adhesive layer has been completely omitted.

In some embodiments, there are varying combinations of transparent substrate layers with affixed images and adhesives but no resin coating. This embodiment may eliminate the resin coating or use an alternative substrate in place of the resin coating.

Further embodiments of the invention include adding pigment between various layers. The pigment may include ink, paint or a variety of mediums. In other embodiments for creating this composite ornamental object a variety of other materials may be included in their fabrication. Additional components can be but are not limited to stones, beads, wire, gems, etc.

There are various possibilities in regard to the relative disposition of the adhesive, affixed image, substrate to which image is affixed, and protective coating. Additionally, various possibilities in regard to the relative disposition of the adhesive or lack thereof, affixed image, resin layer, pigment layer, protective coating, additional substrates and components.

It will be appreciated that the above embodiments and descriptors are intended only to serve as examples and that many other embodiments are possible within the scope of the present invention as defined in the appended claims. Accordingly, besides the objects and advantages of the composite ornamental objects described in my patent, several advantages of the present object are:

(a) to provide an ornamental object that can be produced in a variety of colors without requiring the manufacturer to use highly toxic chemicals.
(b) to provide an ornamental object that is highly versatile and economical.
(c) to provide an ornamental object that is both responsive to ambient light and reflective.
(d) to provide an ornamental object that has a high quality, photographic image.
(e) to provide an ornamental object that can produce a stereoscopic image without the manufacturer using lenticular printing.
(f) to provide an ornamental object that can be personalized.
(g) to provide an object that can be produced in variety of shapes and sizes.
(h) to provide an object that can be produced with the inclusion of varying objects and materials.
(i) to provide and object that can be produced in such a way to include multiple layers.

DETAILED DESCRIPTION

Figure 1:
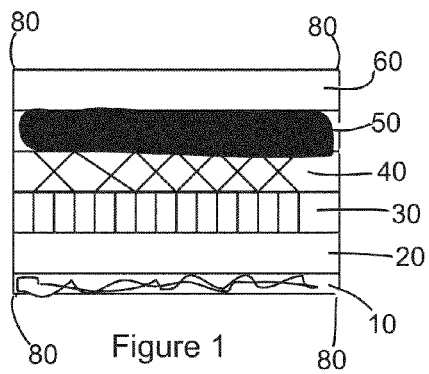
FIG. 1 is a cross-section view of a composite ornamental object with a base, adhesive layer, transparent substrate to which an image is affixed, and protective coating.

The present invention now will be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals in the drawings denote like members.

Embodiments of the present invention include the composite ornamental object and it's fabrication. In some embodiments components are added while others are not present. For example a pigment layer may be added without the resin coating being present. Certain embodiments of the invention and fabrication of such may be adapted to be lower in cost; larger or smaller in size, unobtrusive, heavier or lighter in weight, and/or higher or lower in durability.

FIG. 1 is a cross-section view of a composite ornamental object with a base comprised of a reflective layer 10 and a transparent substrate layer 20, adhesive layer 30, transparent substrate layer 50 to which an image 40 is affixed, and protective coating 60. The corners 80 may be sanded, rounded or resin coated to avoid snagging and personal injury.

Figure 2:
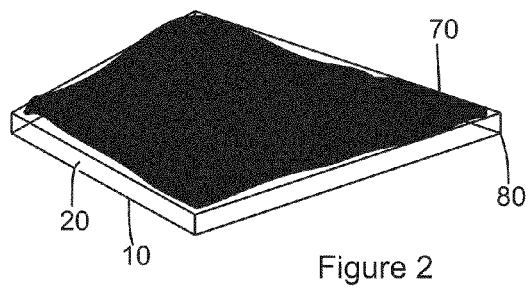
FIG. 2 is the top view of a composite ornamental object having the same composition as those aforementioned in FIG. 1.

FIG. 2 is the top view of a composite ornamental object having the same preferred embodiment as those aforementioned in FIG. 1. Numeral 70 is representative of the adhesive layer 30, transparent substrate layer 50 to which an image 40 is affixed, and protective coating 60.

Figure 3:
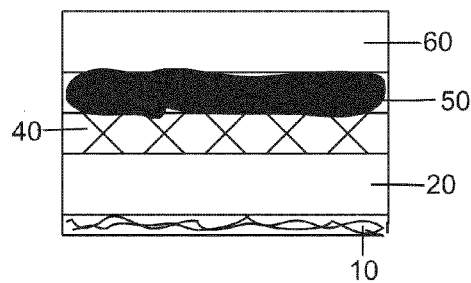
FIG. 3 is a cross-section view of a composite ornamental object in one variation where no adhesive layer is present.

FIG. 3 is a cross-section view of a composite ornamental object in one variation of the preferred embodiment where no adhesive layer 30 is present.

Figure 3A:
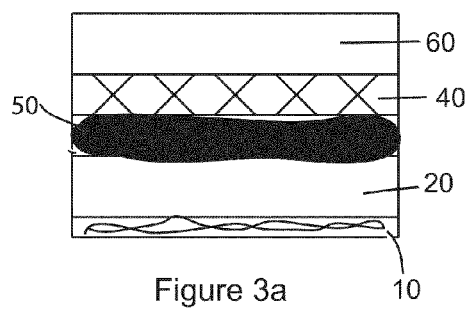
FIG. 3a is a cross-section view of a composite ornamental object in one variation where no adhesive layer is present.

FIG. 3a is a cross-section view of a composite ornamental object in one variation of the preferred embodiment where no adhesive layer 30 is present and the affixed image 40 is located above the transparent substrate layer 50.

Figure 4:
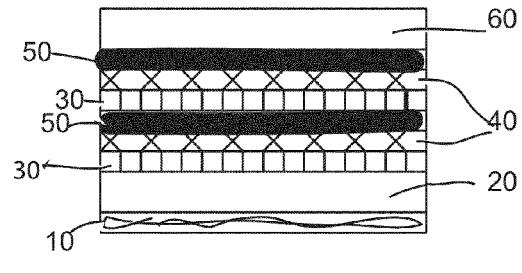
FIG. 4 is a cross-section view of a composite ornamental object in which multiple layers of transparent substrates with affixed images are adhered with two layers of adhesives.

FIG. 4 is a cross-section view of a composite ornamental object in one variation of the preferred embodiment in which multiple layers of transparent substrates 50 with affixed images 40 are adhered with two layers of adhesives 30. Their composition is such that the adhesive layers 30 are located below the affixed images 40.

Figure 4A:
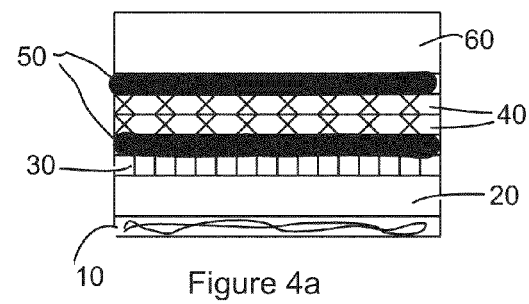
FIG. 4a is a cross-section view of a composite ornamental object in which multiple layers of transparent substrates with affixed images are adhered with one layer of adhesive.

FIG. 4a is a cross-section view of a composite ornamental object in one variation of the preferred embodiment in which multiple layers of transparent substrates 50 with affixed images 40 are adhered with one layer of adhesive 30. Their composition is such that the adhesive layer 30 is located between the base substrate 20 and the transparent substrate 50. The affixed images 40 are placed facing each other with the transparent substrate 50 on either side.

Figure 4B:
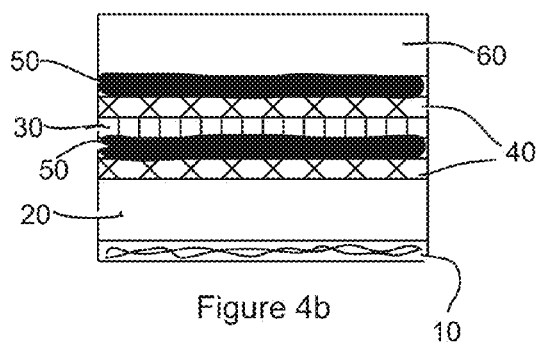
FIG. 4b is a cross-section view of a composite ornamental object in which multiple layers of transparent substrates with affixed images are adhered with one layer of adhesive in which the adhesive layer's position has been changed.

FIG. 4b is a cross-section view of a composite ornamental object in one variation of the preferred embodiment in which multiple layers of transparent substrates 50 with affixed images 40 are adhered with one layer of adhesive 30 in which the adhesive layer's 30 position has been changed. The composition of the invention is such that the adhesive layer 30 is located above a transparent substrate 50 and below an affixed image 40.

Figure 4C:
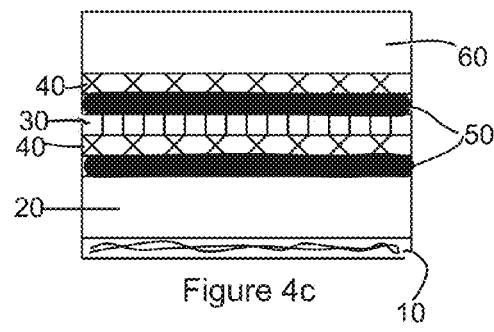
FIG. 4c is a cross-section view of a composite ornamental object in which multiple layers of transparent substrates with affixed images are adhered with one layer of adhesive in which the transparent substrate with affixed image layer's position has been changed.

FIG. 4c is a cross-section view of a composite ornamental object in one variation of the preferred embodiment in which multiple layers of transparent substrates 50 with affixed images 40 are adhered with one layer of adhesive 30 in which the transparent substrate 50 with affixed image 40 layer's position has been changed. The composition of the invention is such that the adhesive layer 30 is located below a transparent substrate 50 and above an affixed image 40.

Figure 4D:
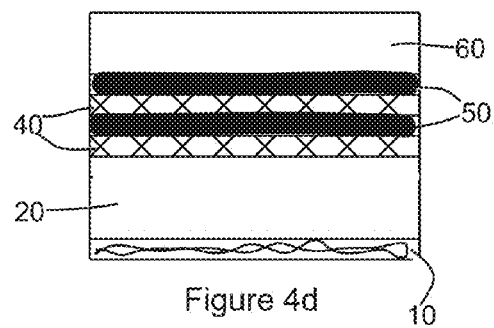
FIG. 4d is a cross-section view of a composite ornamental object in which multiple layers of transparent substrates with affixed images with no adhesive layer.

FIG. 4d is a cross-section view of a composite ornamental object in one variation of the preferred embodiment in which multiple layers of transparent substrates 50 with affixed images 40 have no adhesive layer 30.

Figure 5:
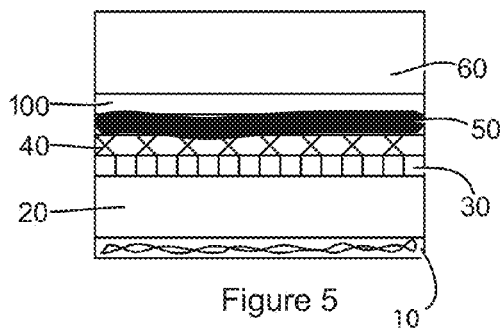
FIG. 5 is a cross-section view of a composite ornamental object with one layer of transparent substrate with affixed image adhered with one layer of adhesive in which an additional substrate layer has been added.

FIG. 5 is a cross-section view of a composite ornamental object in one variation of the preferred embodiment with one layer of transparent substrate 50 with affixed image 40 adhered with one layer of adhesive 30 in which an additional substrate layer 100 has been added.

Figure 6:
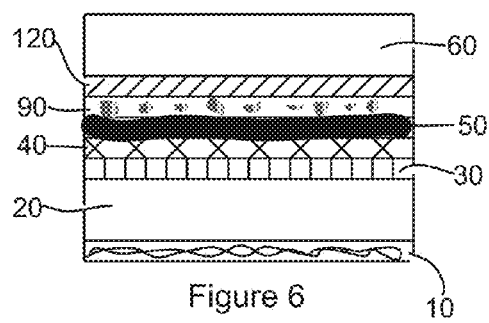
FIG. 6 is a cross-section view of a composite ornamental object with one layer of transparent substrate with affixed image adhered with one layer of adhesive also include a pigment layer and varying component layer.

FIG. 6 is a cross-section view of a composite ornamental object in one variation of the preferred embodiment with one layer of transparent substrate 50 with affixed image 40 adhered with one layer of adhesive 30 also including a pigment layer 120 and varying component layer 90.

Figure 6A:
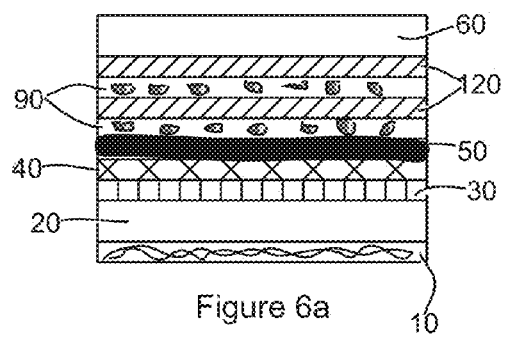
FIG. 6a is a cross-section view of a composite ornamental object with one layer of transparent substrate with affixed image adhered with one layer of adhesive also including one variation of multiple pigment layers and varying component layers.

FIG. 6a is a cross-section view of a composite ornamental object in one variation of the preferred embodiment with one layer of transparent substrate 50 with affixed image 40 are adhered with one layer of adhesive 30 also including one variation of multiple pigment layers 120 and varying component layers 90. The composition of the invention may be such that the transparent substrate 50 with affixed image 40 is located below the multiple layers of pigment 120 and varying component layers 90.

Figure 6B:
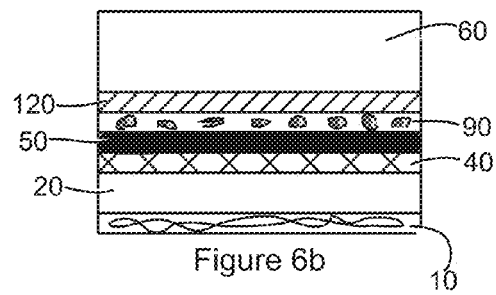
FIG. 6b is a cross-section view of a composite ornamental object with one layer of transparent substrate with affixed image without an adhesive layer but also including a pigment layer and varying component layer.

FIG. 6b is a cross-section view of a composite ornamental object in one variation of the preferred embodiment with one layer of transparent substrate 50 with affixed image 40 without an adhesive layer 30 but also including a pigment layer 120 and varying component layer 90.

Figure 6C:
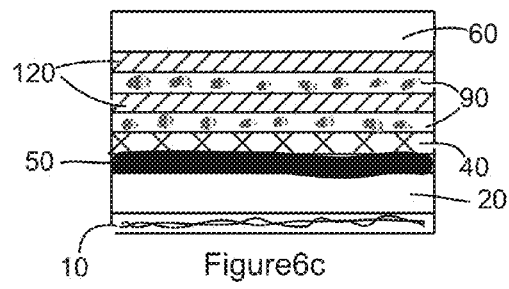
FIG. 6c is a cross-section view of a composite ornamental object with one layer of transparent substrate with affixed image without an adhesive layer but also including multiple pigment layers and varying component layers.

FIG. 6c is a cross-section view of a composite ornamental object in one variation of the preferred embodiment with one layer of transparent substrate 50 with affixed image 40 without an adhesive layer 30 but also including multiple pigment layers 120 and varying component layers 90. The composition of the invention may be such that the transparent substrate 50 with affixed image 40 is located below the multiple layers of pigment 120 and varying component layers 90.

Figure 6D:
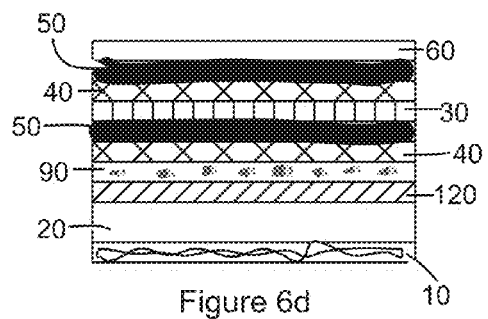
FIG. 6d is a cross-section view of a composite ornamental object in one variation of multiple layers of transparent substrates with affixed images adhered with one layer of adhesive also including a pigment layer and varying component layer.

FIG. 6d is a cross-section view of a composite ornamental object in one variation of the preferred embodiment with multiple layers of transparent substrates 50 with affixed images 40 adhered with one layer of adhesive 30 also including a pigment layer 120 and varying component layer 90. The composition of the invention may be such that the transparent substrate 50 with affixed image 40 is located above a layer of pigment 120 and varying component layer 90.

Figure 6E:
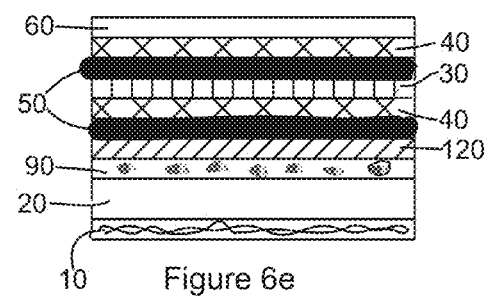
FIG. 6e is a cross-section view of a composite ornamental object in one variation of multiple layers of transparent substrates with affixed images adhered with one layer of adhesive also including a pigment layer and varying component layer.

FIG. 6e is a cross-section view of a composite ornamental object in one variation of the preferred embodiment with multiple layers of transparent substrates 50 with affixed images 40 adhered with one layer of adhesive 30 also including a pigment layer 120 and varying component layer 90. The composition of the invention may be such that the transparent substrate 50 with affixed image 40 is located above a layer of pigment 120 and varying component layer 90.

Figure 6F:
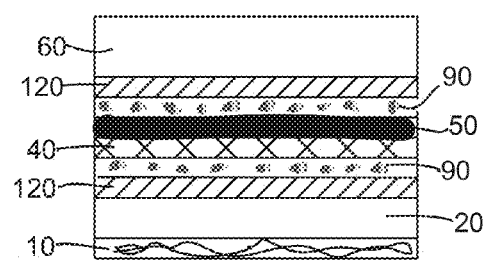
FIG. 6f is a cross-section view of a composite ornamental object in one variation of one layer of transparent substrate with affixed image with no adhesive layer also including multiple pigment layers and varying component layers.

FIG. 6f is a cross-section view of a composite ornamental object in one variation of the preferred embodiment with one layer of transparent substrate 50 with affixed image 40 with no adhesive layer 30 also including multiple pigment layers 120 and varying component layers 90. The composition of the invention may be such that the transparent substrate 50 with affixed image 40 is located between varying component layers 90.

Figure 6G:
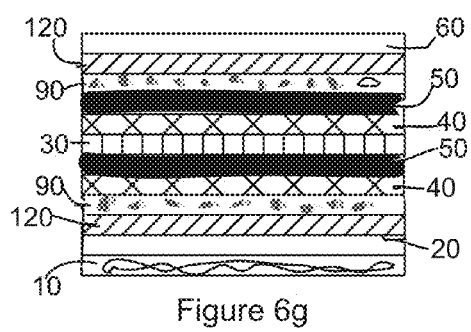
FIG. 6g is a cross-section view of a composite ornamental object in one variation of multiple layers of transparent substrates with affixed images adhered with one layer of adhesive also including multiple pigment layers and varying component layers.

FIG. 6g is a cross-section view of a composite ornamental object in one variation of the preferred embodiment with multiple layers of transparent substrates 50 with affixed images 40 adhered with one layer of adhesive 30 also including multiple pigment layers 120 and varying component layers 90. The composition of the invention may be such that the components are ordered as such starting from the reflective base and moving to the protective coating; reflective base 10, substrate 20, pigment layer 120, component layer 90, affixed image 40, transparent substrate 50, adhesive layer 30. affixed image 40, transparent substrate 50, component layer 90, pigment layer 120, protective coating 60.

Figure 7:
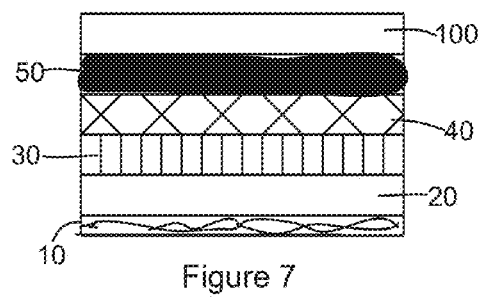
FIG. 7 is a cross-section view of a composite ornamental object with one layer of transparent substrate with affixed image adhered with one layer of adhesive in which no resin coating is present and a substrate layer has been added.

FIG. 7 is a cross-section view of a composite ornamental object with one layer of transparent substrate 50 with affixed image 40 adhered with one layer of adhesive 30 in which no resin coating 60 is present and a substrate layer 100 has been added.

Figure 7A:
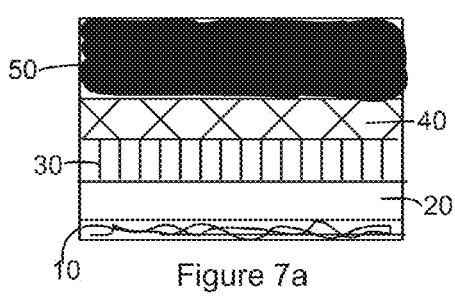
FIG. 7a is a cross-section view of a composite ornamental object with one layer of transparent substrate with affixed image adhered with one layer of adhesive in which no resin coating is present.

FIG. 7a is a cross-section view of a composite ornamental object with one layer of transparent substrate 50 with affixed image 40 adhered with one layer of adhesive 30 in which no resin coating 60 is present.

It will be appreciated that the above embodiments and descriptors are intended only to serve as examples and that many other embodiments are possible within the scope of the present invention as defined in the appended claims. There are various possibilities in regard to the relative disposition of the adhesive, affixed image, substrate to which image is affixed, and protective coating. Additionally, various possibilities in regard to the relative disposition of the adhesive or lack thereof, affixed image, resin layer, pigment layer, protective coating, additional substrates and components.

The invention claimed is:

1. A composite ornamental object comprising a first substrate, a first reflective component formed directly on a first surface of the first substrate, an image layer formed directly on a first surface of the second substrate, the first surface of the second substrate adjoining a second surface of the first substrate, and a protective coating formed on the second surface of the second substrate.

2. The method of manufacturing the composite ornamental object in claim 1 comprising: forming a first reflective component directly on a first surface of the first substrate, forming an image layer directly on a first surface of the second substrate, adjoining the first surface of the second substrate to the second surface of the first substrate, and coating the second surface of the second substrate with a protective coating.

* * * * *